(12) United States Patent
Frazier et al.

(10) Patent No.: US 9,372,819 B2
(45) Date of Patent: Jun. 21, 2016

(54) I/O DEVICE N_PORT ID VIRTUALIZATION

(75) Inventors: Giles R. Frazier, Austin, TX (US); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 12/181,397

(22) Filed: Jul. 29, 2008

(65) Prior Publication Data

US 2010/0030923 A1 Feb. 4, 2010

(51) Int. Cl.
| | |
|---|---|
| G06F 3/00 | (2006.01) |
| G06F 13/38 | (2006.01) |
| H04L 12/927 | (2013.01) |
| G06F 13/42 | (2006.01) |
| H04L 12/931 | (2013.01) |
| H04L 29/08 | (2006.01) |
| G06F 9/50 | (2006.01) |

(52) U.S. Cl.
CPC ............ *G06F 13/387* (2013.01); *H04L 47/805* (2013.01); *G06F 9/5077* (2013.01); *G06F 13/42* (2013.01); *H04L 49/357* (2013.01); *H04L 67/1097* (2013.01)

(58) Field of Classification Search
CPC ... H04L 47/805; H04L 49/357; G06F 13/387; G06F 13/42; G06F 9/5077
USPC ......................................................... 710/11
See application file for complete search history.

(56) References Cited

U.S. PATENT DOCUMENTS

| | | | | |
|---|---|---|---|---|
| 7,007,042 | B2 * | 2/2006 | Lubbers et al. | |
| 7,602,774 | B1 * | 10/2009 | Sundaresan et al. | 370/381 |
| 7,633,955 | B1 * | 12/2009 | Saraiya et al. | 370/401 |
| 7,657,727 | B2 * | 2/2010 | Ito et al. | 711/221 |
| 7,660,302 | B2 * | 2/2010 | McGlaughlin | 370/389 |
| 7,782,869 | B1 * | 8/2010 | Chitlur Srinivasa | 370/395.41 |
| 8,161,134 | B2 * | 4/2012 | Mishra et al. | 709/220 |
| 2003/0189930 | A1 * | 10/2003 | Terrell et al. | 370/389 |
| 2007/0106992 | A1 * | 5/2007 | Kitamura | 718/104 |
| 2008/0127326 | A1 * | 5/2008 | Dugan et al. | 726/15 |
| 2009/0254640 | A1 * | 10/2009 | Otani | 709/221 |
| 2009/0307378 | A1 * | 12/2009 | Allen et al. | 710/4 |

(Continued)

OTHER PUBLICATIONS

Dugan, Robert et al., "NPIV Functionality Profile", Aug. 5, 2002, 7 pages.

(Continued)

*Primary Examiner* — Ernest Unelus
(74) *Attorney, Agent, or Firm* — DeLizio Law, PLLC (57) ABSTRACT

An I/O device obtains multiple unique N_Port IDs (identifiers) for a NPIV N_Port ID Virtualization (NPIV) capable physical adapter. Fabric management routines are able to assign the multiple unique N_Port IDs to distinct fabric zones. LUNs (logical unit numbers) are able to be associated with the multiple unique N_Port IDs such the LUNs associated with unique N_Port ID do not exceed a limitation. The I/O device is able to associate different resources with different unique N_Port IDs to limit the scope of actions of one or more hosts. The I/O device is able to configure one or more LUNs by the multiple unique N_Port IDs to control access. Different unique N_Port IDs are able to be configured to have different quality of service attributes and/or different levels of security. The I/O device may include multiple independent logical partitions (LPARs) and assign each multiple unique N_Port IDs.

17 Claims, 8 Drawing Sheets

(56) References Cited

U.S. PATENT DOCUMENTS

2009/0307388 A1* 12/2009 Tchapda ........................ 710/33
2011/0283026 A1* 11/2011 Otani ............................. 710/72

OTHER PUBLICATIONS

Wong, Frederick, "Introducing N_Port Identifier Virtualization for IBM System z9", 2006, 26 pages.

* cited by examiner

I/O DEVICE N_PORT ID VIRTUALIZATION

TECHNICAL FIELD

The present disclosure generally relates to the field of Fibre Channel Networks, and more particularly to the use of N_Port ID virtualization by I/O devices.

BACKGROUND

In Fibre Channel systems, one or more hosts connect to one or more I/O (input/output) devices via a Fibre Channel fabric. The one or more I/O devices perform I/O services for the one or more hosts. The one or more I/O devices may comprise storage devices. The one or more I/O devices may include I/O controllers conforming to the Fibre Channel/SCSI (small computer system interface) Protocol (FCP) or Fibre Channel Single-Byte Command Code Sets-3 (FC-SB-3 or FICON) standards. The one or more I/O devices may include an I/O physical adapter for communicating with the one or more hosts via the Fibre Channel fabric. A unique N_Port ID (identifier) is obtained for the I/O physical adapter. Then, the I/O physical adapter may be utilized to send one or more Fibre Channel frames utilizing the unique N_Port ID.

The one or more I/O devices may each require the ability to appear as separate independent I/O devices. Typically, to provide this functionality, each of the one or more I/O devices includes multiple I/O physical adapters. A unique N_Port ID may be obtained for each of the multiple I/O physical adapters. Then, each of the multiple I/O physical adapters may be utilized to send one or more Fibre Channel frames utilizing their respective unique N_Port ID. The multiple I/O physical adapters may provide each of the one or more I/O devices additional bandwidth into the fabric.

SUMMARY

In an embodiment of the present disclosure, a Fibre Channel system may include a fabric, one or more hosts communicatively coupled to the fabric, and one or more I/O devices communicatively coupled to the fabric via one or more N_Port ID Virtualization (NPIV) capable physical adapters. The NPIV capable physical adapters may comprise FCP NPIV capable physical adapters and/or FICON NPIV capable physical adapters. The one or more hosts may communicate with the one or more I/O devices via the fabric and the one or more NPIV capable physical adapters. The one or more I/O devices may perform I/O services for the one or more hosts. The I/O devices may obtain multiple unique N_Port IDs for each of the NPIV capable physical adapters.

An I/O device may obtain multiple unique N_Port IDs for a NPIV capable physical adapter by generating a first unique world-wide port name (WWPN), utilizing the first WWPN to obtain a first unique N_Port ID for the NPIV capable physical adapter, generating at least one additional WWPN, and utilizing the at least one additional WWPN to obtain at least one additional unique N_Port ID for the NPIV capable physical adapter. Then, the I/O device may utilize the NPIV capable physical adapter to send one or more Fibre Channel frames utilizing the first unique N_Port ID and/or the at least one additional unique N_Port ID. Thus, I/O device is able to appear to one or more hosts as multiple independent I/O devices, As the NPIV capable physical adapter has multiple N_Port IDs, Fabric management routines are able to assign the first unique N_Port ID for the NPIV capable physical adapter and/or the at least one additional unique N_Port ID for the NPIV capable physical adapter to distinct fabric zones.

The one or more hosts may include limitations on the number of LUNs and/or logical images that the one or more hosts are able to address behind a single N_Port ID. LUNs and/or logical images of the I/O device may be associated with the first unique N_Port ID for the NPIV capable physical adapter and/or the at least one additional unique N_Port ID for the NPIV capable physical adapter such that the number of LUNs and/or logical images associated with the first unique N_Port ID for the NPIV capable physical adapter and/or the at least one additional unique N_Port ID for the NPIV capable physical adapter do not exceed the limitations of the one or more hosts.

Actions of the one or more hosts may have a scope of everything behind the N_Port ID. The I/O device may associate different resources with the first unique N_Port ID for the NPIV capable physical adapter and other resources with the at least one additional unique N_Port ID for the NPIV capable physical adapter. When the host performs such actions on the first N_Port ID, the scope of the actions may thus be limited to the resources of that first N_Port ID and therefore not affect the at least one additional unique N_Port ID for the NPIV capable physical adapter.

The I/O device may configure LUNs and/or logical images by N_Port ID. If the I/O device is unable to prevent the one or more hosts from accessing all of the LUNs of the I/O device accessible using a single N_Port ID, but needs to restrict the one or more hosts to a subset of the LUNs, the I/O device may associate a subset of the LUNs with the at least one additional unique N_Port ID and then grant the one or more hosts access to the at least one additional unique N_Port ID, thereby limiting the one or more hosts to the desired subset of LUNs.

The first unique N_Port ID for the NPIV capable physical adapter and the at least one additional unique N_Port ID for the NPIV capable physical adapter may be configured to have different quality of service attributes. Differentiated quality of service and/or service guarantees for the first unique N_Port ID for the NPIV capable physical adapter and the at least one additional unique N_Port ID for the NPIV capable physical adapter may include, but are not limited to, bandwidth, throughput (operations per second), latency, or recovery attributes. The first unique N_Port ID for the NPIV capable physical adapter and the at least one additional unique N_Port ID for the NPIV capable physical adapter may be configured to provide different levels of security including, but not limited to, authentication keys and/or data encryption.

In an alternative embodiment to an I/O device without LPARs, the one or more I/O devices may include multiple independent logical partitions (LPARs). A hypervisor of an I/O device may generate a first unique world-wide port name (WWPN), utilize the first WWPN to obtain a first unique N_Port ID for the NPIV capable physical adapter for a first LPAR, generate at least one additional WWPN, and utilize the at least one additional WWPN to obtain at least one additional unique N_Port ID for the NPIV capable physical adapter for at least one additional LPAR. Then, the first LPAR may utilize hypervisor services to send one or more Fibre Channel frames utilizing the first unique N_Port ID and/or the at least one additional LPAR may utilize hypervisor services to send one or more Fibre Channel frames utilizing the at least one additional unique N_Port ID. Thus, the LPARs of the I/O device are able to appear to the one or more hosts as multiple independent I/O devices. As the first LPAR and the at least one additional LPAR have distinct N_Port IDs, Fabric management routines are able to assign the first LPAR and/or at least one additional LPAR to distinct fabric zones.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
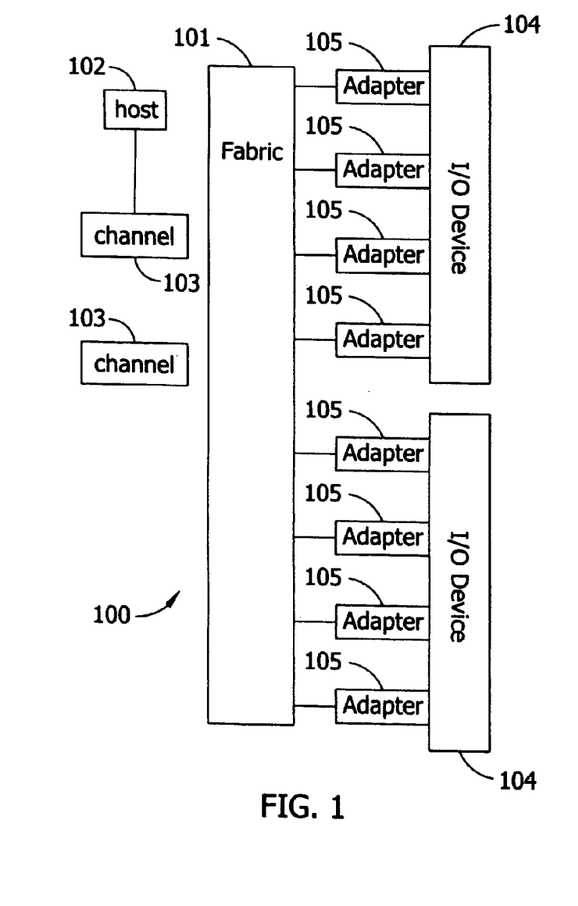
FIG. 1 is a block diagram illustrating a Fibre Channel system.

FIG. 1 is a block diagram illustrating a Fibre Channel system 100. The Fibre Channel system 100 includes a fabric 101, channels 103 communicatively coupled to the fabric 101, host 102 communicatively coupled to channel 103, and I/O (input/output) devices 104 communicatively coupled to the fabric 101 via physical adapters 105. Channels 103 may comprise a Fibre Channel/SCSI (small computer system interface) Protocol (FCP) channel and/or a Fibre Channel Single-Byte Command Code Sets-3 (FC-SB-3 or FICON) channel. Physical adapters 105 may comprise Fibre Channel/SCSI (small computer system interface) Protocol (FCP) physical adapters and/or Fibre Channel Single-Byte Command Code Sets-3 (FC-SB-3 or FICON) physical adapters. Host 102 may communicate with I/O devices 104 via channel 103, the fabric 101, and physical adapters 105. I/O devices 104 may perform I/O services for host 102. Physical adapters 105 may enable each I/O device 104 to appear as multiple independent I/O devices. As illustrated, each I/O device 104 includes four physical adapters 105 and may thus be enabled to appear as four independent I/O devices. However, the bandwidth of physical adapters 105 may be such that I/O devices 104 may not require the additional bandwidth into the fabric 101 provided by the multiple physical adapters 105. The only reason for providing each I/O device 104 with a multiple physical adapters 105 is to enable each I/O device 104 to appear to host 102 as multiple independent I/O devices. The additional bandwidth provided by the dedicated physical adapters 205 may be unused. This unused bandwidth represents an inefficient usage of a high-cost component (physical adapters 105). The unnecessary physical adapters 105 greatly increase the cost of Fibre Channel system 100.

Figure 2:
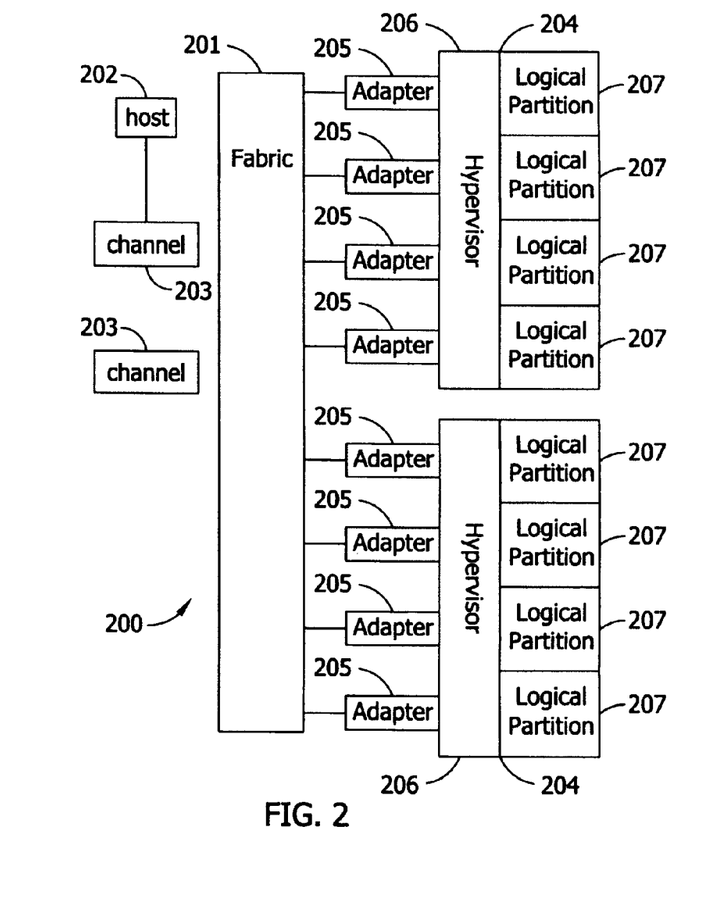
FIG. 2 is a block diagram illustrating a Fibre Channel system containing multiple independent logical partitions (LPARs)

FIG. 2 is a block diagram illustrating a Fibre Channel system 200 containing multiple independent logical partitions (LPARs) 207. The Fibre Channel system 200 includes a fabric 201, channels 203 communicatively coupled to the fabric 201, host 202 communicatively coupled to channel 203, and I/O devices 204 communicatively coupled to the fabric 101 via physical adapters 205. Channels 203 may comprise a FCP channel and/or a FICON channel. Physical adapters 205 may comprise FCP physical adapters and/or FICON physical adapters. Host 202 may communicate with I/O devices 204 via channel 203, the fabric 201, and physical adapters 205. I/O devices 204 may perform I/O services for host 202. Physical adapters 205 may enable each I/O device 204 to appear as multiple independent I/O devices. As illustrated, each I/O device 204 includes four physical adapters 205 and may thus be enabled to appear as four independent I/O devices. Each LPAR 207 may be associated with a dedicated physical adapter 205 to provide the LPAR the ability to appear as if it were a unique I/O device and to provide the LPAR 207 with additional bandwidth to the fabric 201. As each physical adapter 205 has a unique N_Port ID (identifier) within the fabric 201, the LPAR 207 is able to become a member of a distinct fabric zone and to appear to host 202 as if it were an independent I/O device capable of providing services such as reservations, LUN (logical unit number) masking, command queuing, and configuration. However, the bandwidth of physical adapters 205 may be such that I/O devices 204 may not require the additional bandwidth into the fabric 201 provided by the multiple physical adapters 205. The only reason for providing each LPAR 207 with a dedicated physical adapter 205 is to enable each LPAR 207 to appear to host 202 as an independent control unit, thereby enabling LPAR 207 to become a member of a distinct fabric zone and appear to host 202 as if LPAR 207 were an independent I/O device. The additional bandwidth provided by the dedicated physical adapters 205 is unused. This unused bandwidth represents an inefficient usage of a high-cost component (physical adapters 205). The unnecessary dedicated physical adapters 205 greatly increase the cost of Fibre Channel system 200.

Figure 3:
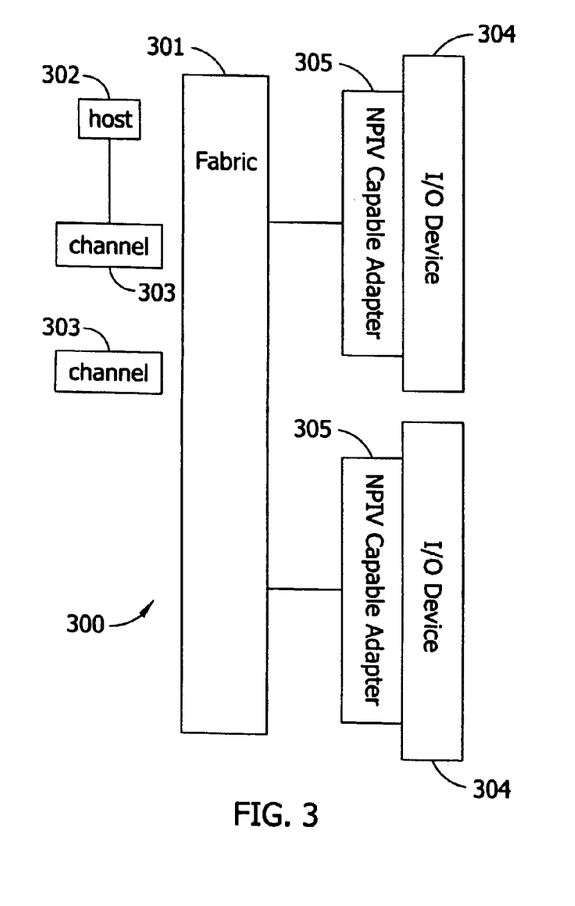
FIG. 3 is a block diagram illustrating a Fibre Channel system, in accordance with an embodiment of the present disclosure.

FIG. 3 is a block diagram illustrating a Fibre Channel system 300, in accordance with an embodiment of the present disclosure. The Fibre Channel system 300 includes a fabric 301, channels 303 communicatively coupled to the fabric 301, host 302 communicatively coupled to channel 303, and I/O devices 304 communicatively coupled to the fabric 301 via N_Port ID Virtualization (NPIV) capable physical adapters 305. Channels 303 may comprise a FCP channel and/or a FICON channel. NPIV capable physical adapters 305 may comprise FCP NPIV capable physical adapters and/or FICON NPIV capable physical adapters. Host 302 may communicate with I/O devices 304 via channel 303, the fabric 301, and NPIV capable physical adapters 305. I/O devices 304 may perform I/O services for host 302. I/O devices 304 may obtain multiple unique N_Port IDs for NPIV capable physical adapters 305. An I/O device 304 may obtain multiple unique N_Port IDs for its NPIV capable physical adapter 305 by generating a first unique world-wide port name (WWPN), utilizing the first WWPN to obtain a first unique N_Port ID for the NPIV capable physical adapter 305, generating at least one additional WWPN, and utilizing the at least one additional WWPN to obtain at least one additional unique N_Port ID for the NPIV capable physical adapter 305. Then, the I/O device 304 may utilize the NPIV capable physical adapter 305 to send one or more Fibre Channel frames utilizing the first unique N_Port ID and/or the at least one additional unique N_Port ID. Thus, I/O device 304 is able to appear to host 302 as multiple independent control units, thereby enabling I/O device 304 to appear to host 302 as multiple independent I/O devices. The I/O device 304 may register the first unique N_Port ID for the NPIV capable physical adapter 305 with a Fabric Nameserver so that host 302 is aware of its existence. The I/O device 304 may register the first unique N_Port ID for the NPIV capable physical adapter 305 with the fabric 301 for state change notifications. The I/O device 304 may accept communications (e.g. I/O commands, reservations, etc.) from host 302 utilizing the first unique N_Port ID for the NPIV capable physical adapter 305, and/or provide a unique set of LUN maskings utilizing the first unique N_Port ID for the NPIV capable physical adapter 305. The I/O device 304 may register the at least one additional unique N_Port ID for the NPIV capable physical adapter 305 with a Fabric Nameserver so that host 302 is aware of its existence. The I/O device 304 may register the at least one additional unique N_Port ID for the NPIV capable physical adapter 305 with the fabric 301 for state change notifications. The I/O device 304 may accept communications (e.g. I/O commands, reservations etc.) from host 302 utilizing the at least one additional unique N_Port ID for the NPIV capable physical adapter 305, and/or provide a unique set of LUN maskings utilizing the at least one additional unique N_Port ID for the NPIV capable physical adapter 305. As the NPIV capable physical adapter 305 has multiple N_Port IDs, Fabric management routines are able to assign the first unique N_Port ID for the NPIV capable physical adapter 305 and/or the at least one additional unique N_Port ID for the NPIV capable physical adapter 305 to distinct fabric zones.

Host 302 may include a limitation on the number of LUNs and/or logical images that host 302 is able to address behind a single N_Port ID. As the NPIV capable physical adapter 305 has multiple N_Port IDs, the limitation on the number of LUNs and/or logical images of the I/O device 304 that host 302 is able to address may be bypassed. LUNs and/or logical images of the I/O device 304 may be associated with the first unique N_Port ID for the NPIV capable physical adapter 305 and/or the at least one additional unique N_Port ID for the NPIV capable physical adapter 305 such that the number of LUNs and/or logical images associated with the first unique N_Port ID for the NPIV capable physical adapter 305 and/or the at least one additional unique N_Port ID for the NPIV capable physical adapter 305 do not exceed the limitation of host 302.

Actions of host 302 (including, but not limited to, Target_Reset) may have a scope of everything behind the N_Port ID. The I/O device may associate different resources with the first unique N_Port ID for the NPIV capable physical adapter and other resources with the at least one additional unique N_Port ID for the NPIV capable physical adapter. By controlling the resources of the I/O device 304 that are associated with the first unique N_Port ID for the NPIV capable physical adapter 305 and/or the at least one additional unique N_Port ID for the NPIV capable physical adapter 305, the I/O device 304 may be able to partition the scope of such actions.

The I/O device 304 may configure LUNs and/or logical images by N_Port ID. If the I/O device 304 is unable to prevent the host 302 from accessing all of the LUNs of the I/O device 304 accessible using a single N_Port ID, but needs to restrict host 302 to a subset of the LUNs, the I/O device 304 may associate a subset of the LUNs with the at least one additional unique N_Port ID for the NPIV capable physical adapter 305 and then grant host 302 access to the at least one additional unique N_Port ID for the NPIV capable physical adapter 305, thereby limiting host 302 to the desired subset of LUNs. For example, host 302 may have access to the first unique N_Port ID for the NPIV capable physical adapter 305 but not the at least one additional unique N_Port ID for the NPIV capable physical adapter 305. The I/O device 304 may control the access of host 302 to one or more LUNs and/or logical images by configuring the one or more LUNS and/or logical images by the first unique N_Port ID for the NPIV capable physical adapter 305 or the at least one additional unique N_Port ID for the NPIV capable physical adapter 305. If the one or more LUNs and/or logical images were configured by the first unique N_Port ID for the NPIV capable physical adapter 305, host 302 would have access to the one or more LUNs and/or logical images. If the one or more LUNs and/or logical images were configured by the at least one additional unique N_Port ID for the NPIV capable physical adapter 305, host 302 would not have access to the one or more LUNs and/or logical images.

The first unique N_Port ID for the NPIV capable physical adapter 305 and the at least one additional unique N_Port ID for the NPIV capable physical adapter 305 may be configured to have different quality of service attributes. The first unique N_Port ID for the NPIV capable physical adapter 305 and the at least one additional unique N_Port ID for the NPIV capable physical adapter 305 may be configured to have different quality of service attributes in the fabric 301 and/or the I/O device 304. Differentiated quality of service and/or service guarantees for the first unique N_Port ID for the NPIV capable physical adapter 305 and the at least one additional unique N_Port ID for the NPIV capable physical adapter 305 may include, but are not limited to, bandwidth, throughput (operations per second), latency, or recovery attributes. For example, host 302 may utilize the I/O device 304 both for production applications and for maintenance operations. Production applications and maintenance operations typically require different service attributes at the I/O device. In this case, the first unique N_Port ID for the NPIV capable physical adapter 305 may be configured with the service attributes required for production applications and the at least one additional unique N_Port ID for the NPIV capable physical adapter 305 may be configured with the service attributes required for maintenance operations. During operations, production programs may access the first unique N_Port ID for the NPIV capable physical adapter 305 and maintenance applications may access the at least one additional unique N_Port ID for the NPIV capable physical adapter 305. The first unique N_Port ID for the NPIV capable physical adapter 305 and the at least one additional unique N_Port ID for the NPIV capable physical adapter 305 may be assigned to distinct fabric zones. The first unique N_Port ID for the NPIV capable physical adapter 305 may be assigned to a production application zone and the at least one additional unique N_Port ID for the NPIV capable physical adapter 305 may be assigned to a maintenance zone. This may provide a secure barrier between the production applications and the maintenance operations.

The first unique N_Port ID for the NPIV capable physical adapter 305 and the at least one additional unique N_Port ID for the NPIV capable physical adapter 305 may be configured to provide different levels of security. For example, communication with the first unique N_Port ID for the NPIV capable physical adapter 305 may require authentication keys whereas communication with the at least one additional unique N_Port ID for the NPIV capable physical adapter 305 may not require authentication keys. By way of another example, communication with the first unique N_Port ID for the NPIV capable physical adapter 305 may not require data encryption whereas communication with the at least one additional unique N_Port ID for the NPIV capable physical adapter 305 may require data encryption.

Although the present disclosure has been described utilizing one host 302, two channels 303, and two I/O devices 304, it should be understood that any number of hosts 302 (such as two or one hundred), channels 303 (such as five or seventeen), and I/O devices 304 (such as six or a thousand) may be utilized without departing from the scope of the present disclosure. Although the present disclosure has been described as utilizing one NPIV capable physical adapter 305 for an I/O device 304, it should be understood that any number of NPIV capable physical adapters 305 (such as two or twenty) may be included in an I/O device 304 without departing from the scope of the present disclosure.

The I/O device N_Port ID virtualization described above and illustrated in FIG. 3 may be performed by computer readable instructions stored on a tangible computer usable medium and/or a tangible computer readable medium including, but not limited to, a tangible computer readable storage medium. The tangible computer readable storage medium may include, but is not limited to a hard disk drive, a solid state drive, an optical storage medium, a memory, a random access memory, a read only memory, a flash memory, a cache memory, an optical disk, a floppy disk, a universal serial bus drive, a register, paper tape, a punch card, a ram disk, a ZIP disk, magnetic tape, volatile memory, non-volatile memory, dynamic memory, static memory, dynamic random access memory, synchronous dynamic random access memory, and/or a tape cartridge.

Figure 4:
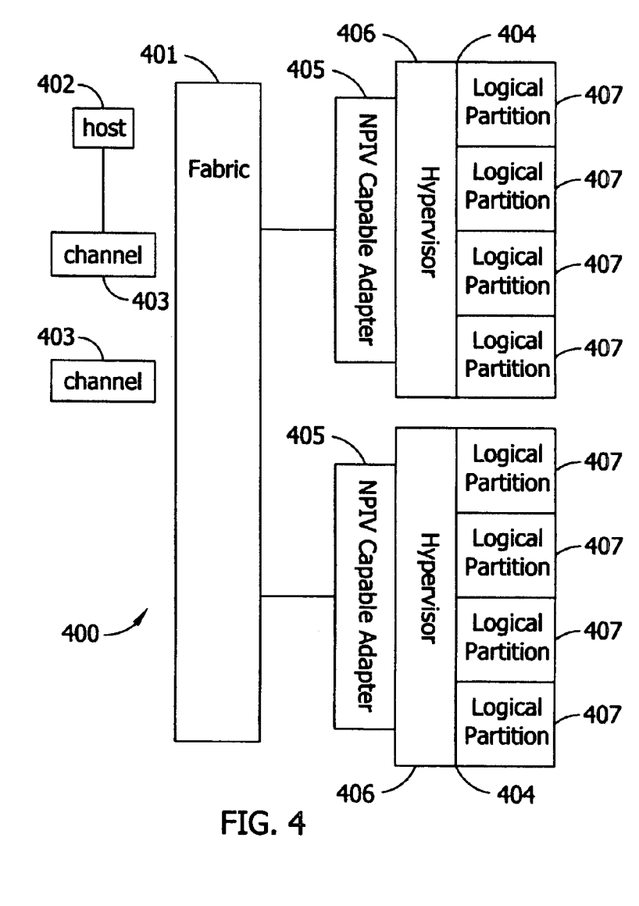
FIG. 4 is block diagram illustrating a Fibre Channel system containing LPARs, in accordance with an alternative embodiment of the present disclosure.

FIG. 4 is a block diagram illustrating a Fibre Channel system 400 containing LPARs 407, in accordance with an alternative embodiment of the present disclosure. The Fibre Channel system 400 includes a fabric 401, channels 403 communicatively coupled to the fabric 401, host 402 communicatively coupled to channel 403, and I/O devices 404 communicatively coupled to the fabric 401 via NPIV capable physical adapters 405. I/O devices 404 include LPARs 407. Channels 403 may comprise a FCP channel and/or a FICON channel. NPIV capable physical adapters 405 may comprise FCP NPIV capable physical adapters and/or FICON NPIV capable physical adapters. Host 402 may communicate with I/O devices 404 via channel 403, the fabric 401, and NPIV capable physical adapters 405. I/O devices 404 may perform I/O services for host 402. Hypervisor 406 of I/O device 404 may generate a first unique world-wide port name (WWPN), utilize the first WWPN to obtain a first unique N_Port ID for the NPIV capable physical adapter 305 for a first LPAR 407, generate at least one additional WWPN, and utilize the at least one additional WWPN to obtain at least one additional unique N_Port ID for the NPIV capable physical adapter 305 for at least one additional LPAR 407. Then, the first LPAR 407 may utilize hypervisor 406 services to send one or more Fibre Channel frames utilizing the first unique N_Port ID and/or the at least one additional LPAR 407 may utilize hypervisor 406 services to send one or more Fibre Channel frames utilizing the at least one additional unique N_Port ID. Thus, the LPARs 407 of I/O device 404 are able to appear to host 402 as multiple independent control units, thereby enabling the LPARs 407 of I/O device 404 to appear to host 402 as multiple independent I/O devices. The first LPAR 407 may register with a Fabric Nameserver so that host 402 is aware of its existence. The first LPAR 407 may register with the fabric 401 for state change notifications. The first LPAR 407 may accept communications (e.g. I/O commands, reservations, etc.) from host 402, and/or provide a unique set of LUN maskings. The at least one additional LPAR 407 may register with a Fabric Nameserver so that host 402 is aware of its existence. The at least one additional LPAR 407 may register with the fabric 401 for state change notifications. The at least one additional LPAR 407 may accept communications (e.g. I/O commands, reservations, etc.) from host 402, and/or provide a unique set of LUN maskings. As the first LPAR 407 and the at least one additional LPAR 407 have distinct N_Port IDs, Fabric management routines are able to assign the first LPAR 407 and/or at least one additional LPAR 407 to distinct fabric zones.

Although the present disclosure has been described utilizing one host 402, two channels 403, and two I/O devices 404, it should be understood that any number of hosts 402 (such as two or one hundred), channels 403 (such as five or seventeen), and I/O devices 404 (such as six or a thousand) may be utilized without departing from the scope of the present disclosure. Although the present disclosure has been described as utilizing one NPIV capable physical adapter 405 for an I/O device 404, it should be understood that any number of NPIV capable physical adapters 405 (such as two or twenty) may be included in an I/O device 404 without departing from the scope of the present disclosure. Although the present disclosure has been described as utilizing four LPARs 407 for an I/O device 404, it should be understood that any number of LPARs (such as one or a thousand) may be contained in an I/O device 404 without departing from the scope of the present disclosure.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, or semiconductor system, apparatus, device; or propagation medium. More specific examples (a non-exhaustive list) of the computer-readable medium would include the following: an electrical connection. having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 5:
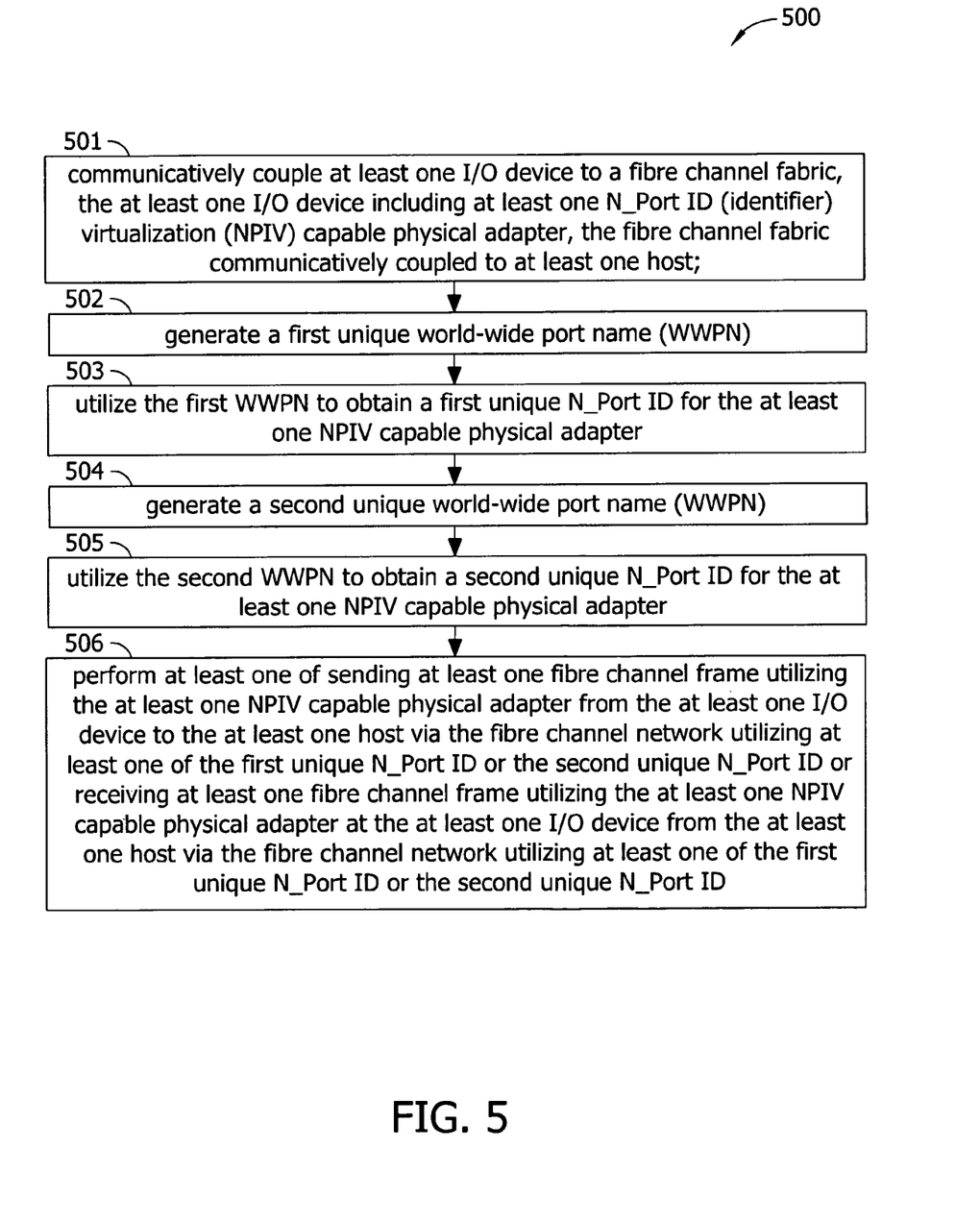
FIG. 5 is a flow diagram illustrating a method for I/O device N_Port ID virtualization, in accordance with an alternative embodiment of the present disclosure.

FIG. 5 illustrates a method for I/O device N_Port ID Virtualization, in accordance with an alternative embodiment of the present disclosure. In step 501 communicatively couple at least one I/O device to a fibre channel fabric, the at least one I/O device including at least one N_Port ID (identifier) virtualization (NPIV) capable physical adapter, the fibre channel fabric communicatively coupled to at least one host. In step 502, generate a first unique world-wide port name (WWPN). In step 503, utilize the first WWPN to obtain a first unique N_Port ID for the at least one NPIC capable physical adapter. In step 504, generate a second unique world-wide port name (WWPN). In step 505, utilize the second WWPN to obtain a second unique N_Port ID for the at least one NPIC capable physical adapter. In step 506, perform at least one of sending at least one fibre channel frame utilizing the at least one NPIV capable physical adapter from the at least one I/O device to the at least one host via the fibre channel network utilizing at least one of the first unique N_Port ID or the second unique N_Port ID or receiving at least one fibre channel frame utilizing the at least one NPIV capable physical adapter at the at least one I/O device from the at least one host via the fibre channel network utilizing at least one of the first unique N_Port ID or the second unique N_Port ID.

Figure 6:
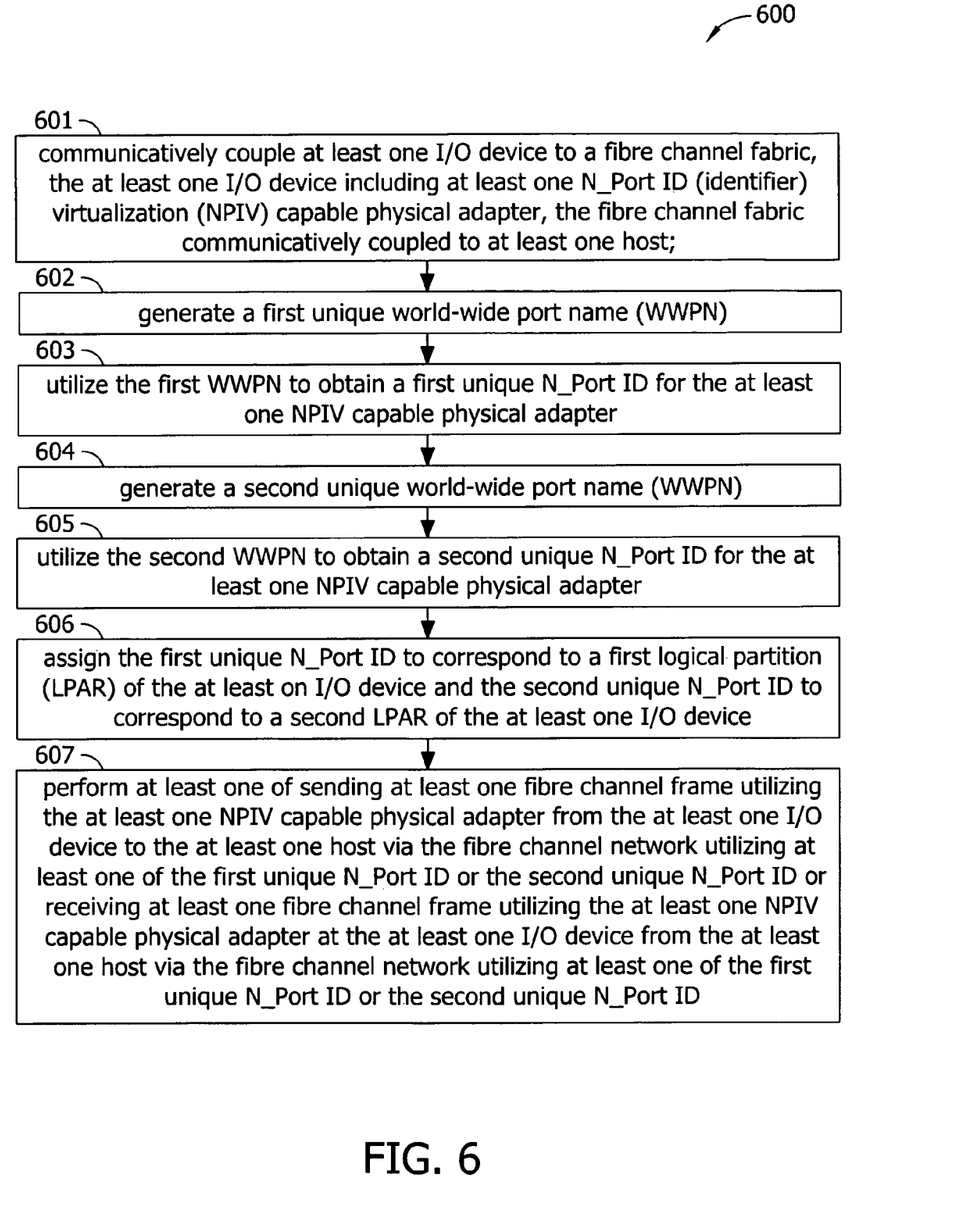
FIG. 6 is a flow diagram illustrating a method for I/O device N_Port ID virtualization, in accordance with an alternative embodiment of the present disclosure.

FIG. 6 illustrates a method for I/O device N_Port ID Virtualization, in accordance with an alternative embodiment of the present disclosure. In step 601, communicatively couple at least one I/O device to a fibre channel fabric, the at least one I/O device including at least one N_Port ID (identifier) virtualization (NPIV) capable physical adapter, the fibre channel fabric communicatively coupled to at least one host. In step 602, generate a first unique world-wide port name (WWPN). In step 603, utilize the first WWPN to obtain a first unique N_Port ID for the at least one NPIC capable physical adapter. In step 604, generate a second unique world-wide port name (WWPN). In step 605, utilize the second WWPN to obtain a second unique N_Port ID for the at least one NPIC capable physical adapter. In step 606, assign the first unique N_Port ID to correspond to a first logical partition (LPAR) of the at least one I/O device and the second unique N_Port ID to correspond to a second LPAR of the at least one I/O device. In step 607, perform at least one of sending at least one fibre channel frame utilizing the at least one NPIV capable physical adapter from the at least one I/O device to the at least one host via the fibre channel network utilizing at least one of the first unique N_Port ID or the second unique N_Port ID or receiving at least one fibre channel frame utilizing the at least one NPIV capable physical adapter at the at least one I/O device from the at least one host, via the fibre channel network utilizing at least one of the first unique N_Port ID or the second unique N_Port ID.

Figure 7:
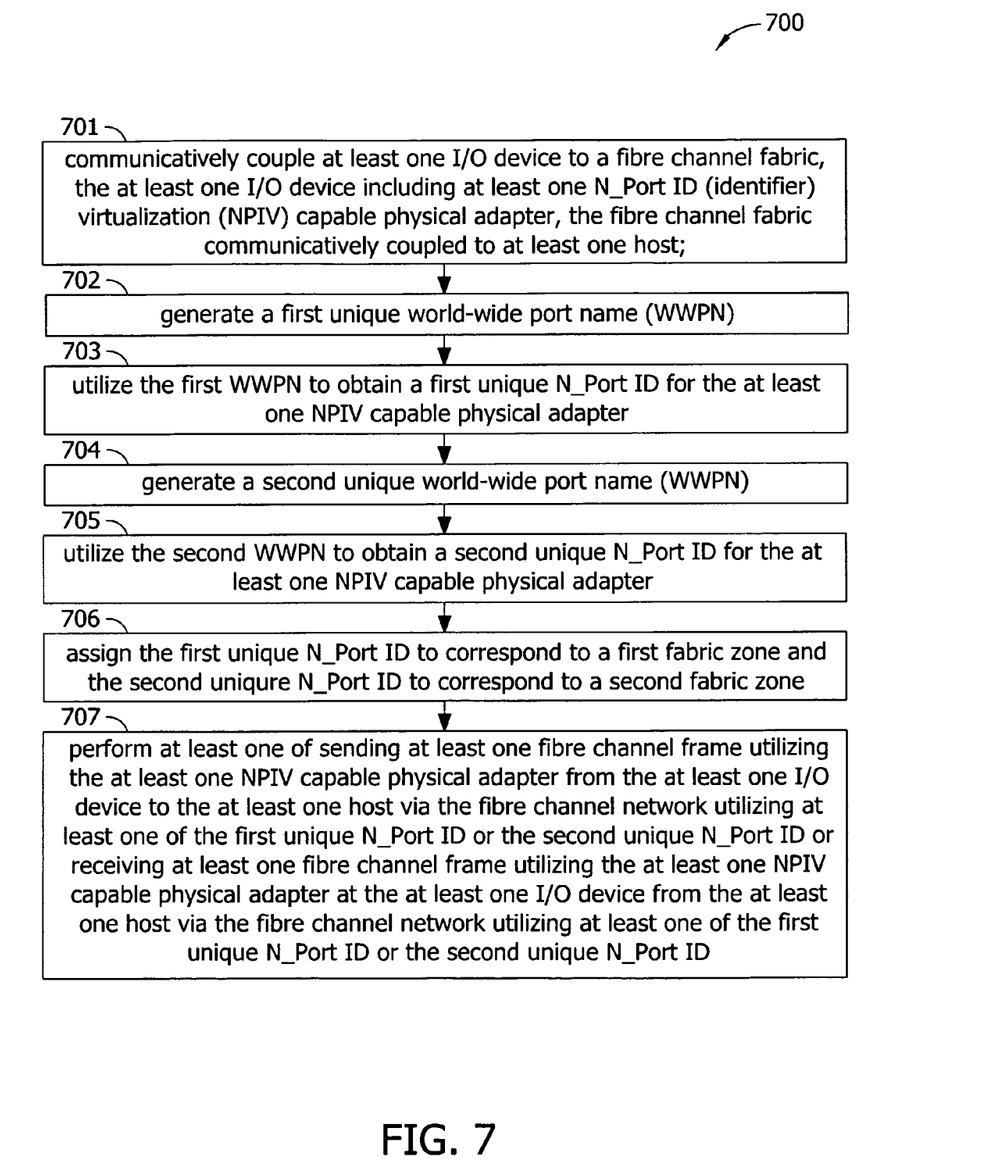
FIG. 7 is a flow diagram illustrating a method for I/O device N_Port ID virtualization, in accordance with an alternative embodiment of the present disclosure.

FIG. 7 illustrates a method for I/O device N_Port ID Virtualization, in accordance with an alternative embodiment of the present disclosure. In step 701, communicatively couple at least one I/O device to a fibre channel fabric, the at least one I/O device including at least one N_Port ID (identifier) virtualization (NPIV) capable physical adapter, the fibre channel fabric communicatively coupled to at least one host. In step 702, generate a first unique world-wide port name (WWPN). In step 703, utilize the first WWPN to obtain a first unique N_Port ID for the at least one NPIC capable physical adapter. In step 704, generate a second unique world-wide port name (WWPN). In step 705, utilize the second WWPN to obtain a second unique N_Port ID for the at least one NPIC capable physical adapter. In step 706, assign the first unique N_Port ID to correspond to a first fabric zone and the second unique N_Port ID to correspond to a second fabric zone. In step 707, perform at least one of sending at least one fibre channel frame utilizing the at least one NPIV capable physical adapter from the at least one I/O device to the at least one host via the fibre channel network utilizing at least one of the first unique N_Port ID or the second unique N_Port ID or receiving at least one fibre channel frame utilizing the at least one NPIV capable physical adapter at the at least one I/O device from the at least one host via the fibre channel network utilizing at least one of the first unique N_Port ID or the second unique N_Port ID.

Figure 8:
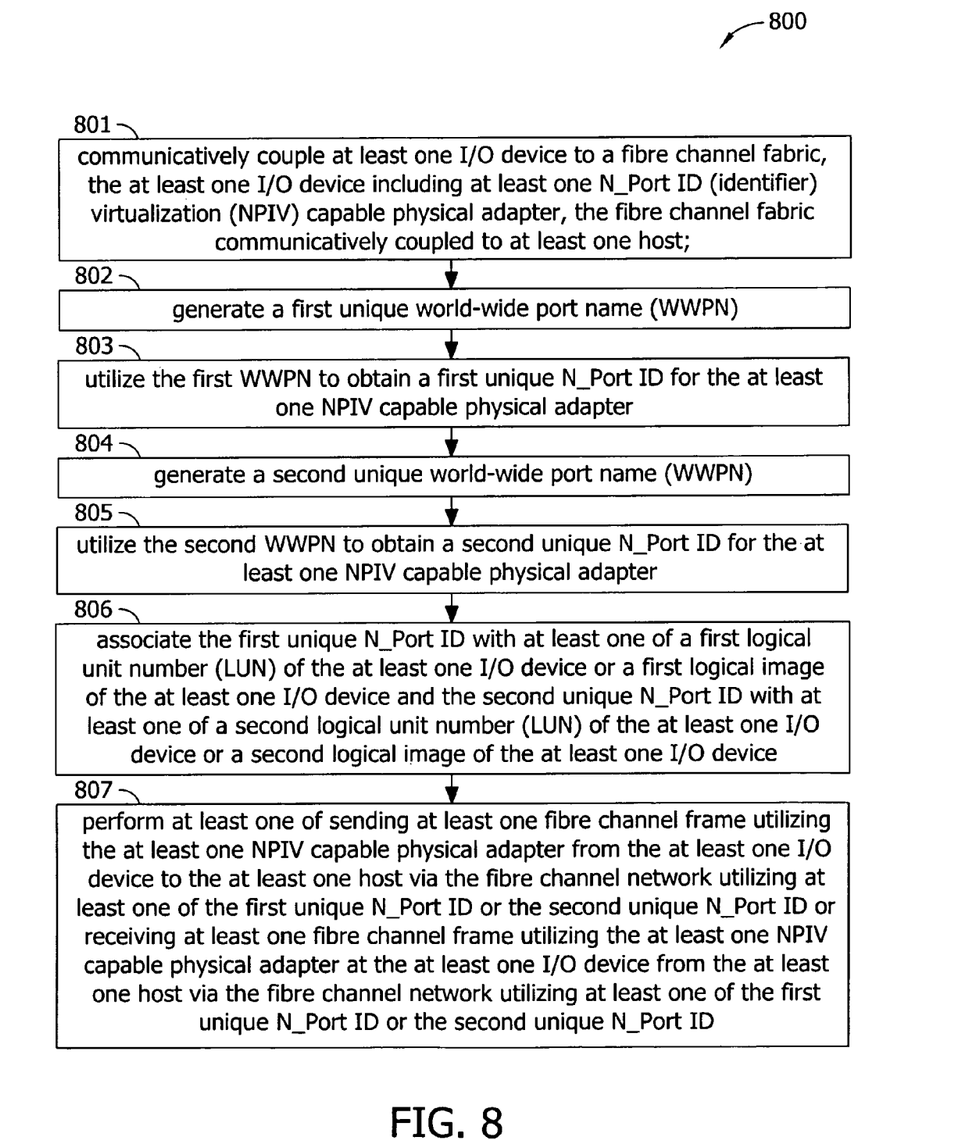
FIG. 8 is a flow diagram illustrating a method for I/O device N_Port ID virtualization, in accordance with an alternative embodiment of the present disclosure.

FIG. 8 illustrates a method for I/O device N_Port ID Virtualization, in accordance with an alternative embodiment of the present disclosure. In step 801, communicatively couple at least one I/O device to a fibre channel fabric, the at least one I/O device including at least one N_Port ID (identifier) virtualization (NPIV) capable physical adapter, the fibre channel fabric communicatively coupled to at least one host. In step 802, generate a first unique world-wide port name (WWPN). In step 803, utilize the first WWPN to obtain a first unique N_Port ID for the at least one NPIC capable physical adapter. In step 804, generate a second unique world-wide port name (WWPN). In step 805, utilize the second WWPN to obtain a second unique N_Port ID for the at least one NPIC capable physical adapter. In step 806, associate the first unique N_Port ID with at least one of a first logical unit number (LUN) of the at least one I/O device or a first logical image of the at least one I/O device and the second unique N_Port ID with at least one of a second logical unit number (LUN) of the at least one I/O device or a second logical image of the at least one I/O device. In step 807, perform at least one of sending at least one fibre channel frame utilizing the at least one NPIV capable physical adapter from the at least one I/O device to the at least one host via the fibre channel network utilizing at least one of the first unique N_Port ID or the second unique N_Port ID or receiving at least one fibre channel frame utilizing the at least one NPIV capable physical adapter at the at least one I/O device from the at least one host via the fibre channel network utilizing at least one of the first unique N_Port ID or the second unique N_Port ID.

Figure 9:
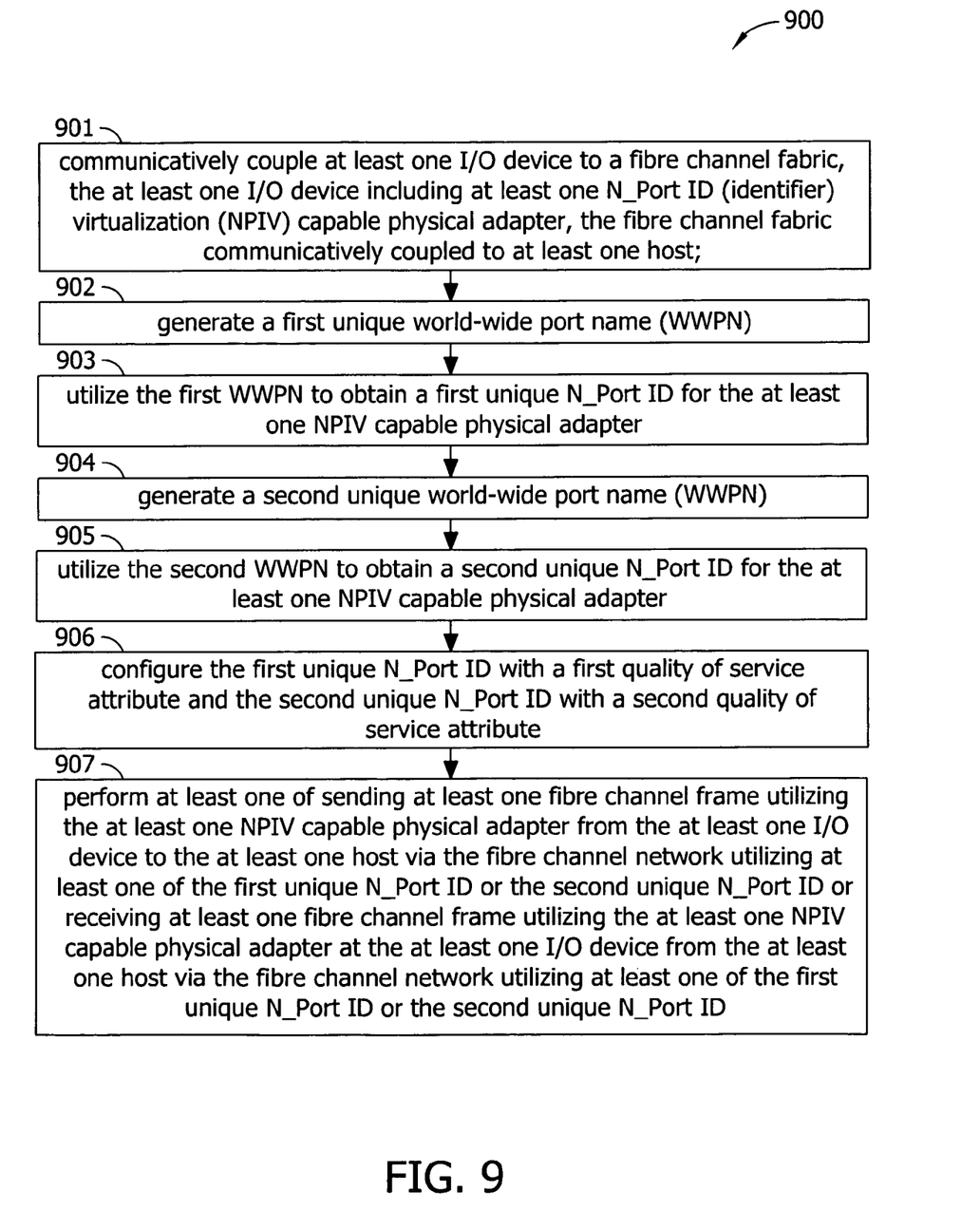
FIG. 9 is a flow diagram illustrating a method for I/O device N_Port ID virtualization, in accordance with an alternative embodiment of the present disclosure.

FIG. 9 illustrates a method for I/O device N_Port ID Virtualization, in accordance with an alternative embodiment of the present disclosure. In step 901, communicatively couple at least one I/O device to a fibre channel fabric, the at least one I/O device including at least one N_Port ID (identifier) virtualization (NPIV) capable physical adapter, the fibre channel fabric communicatively coupled to at least one host. In step 902, generate a first unique world-wide port name (WWPN). In step 903, utilize the first WWPN to obtain a first unique N_Port ID for the at least one NPIC capable physical adapter. In step 904, generate a second unique world-wide port name (WWPN). In step 905, utilize the second WWPN to obtain a second unique N_Port ID for the at least one NPIC capable physical adapter. In step 906, configure the first unique N_Port ID with a first quality of service attribute and the second unique N_Port ID With a second quality of service attribute. In step 907, perform at least one of sending at least one fibre channel frame utilizing the at least one NPIV capable physical adapter from the at least one I/O device to the at least one host via the fibre channel network utilizing at least one of the first unique N_Port ID or the second unique N_Port ID or receiving at least one fibre channel frame utilizing the at least one NPIV capable physical adapter at the at least one I/O device from the at least one host via the fibre channel network utilizing at least one of the first unique N_Port ID or the second unique N_Port ID.

Figure 10:
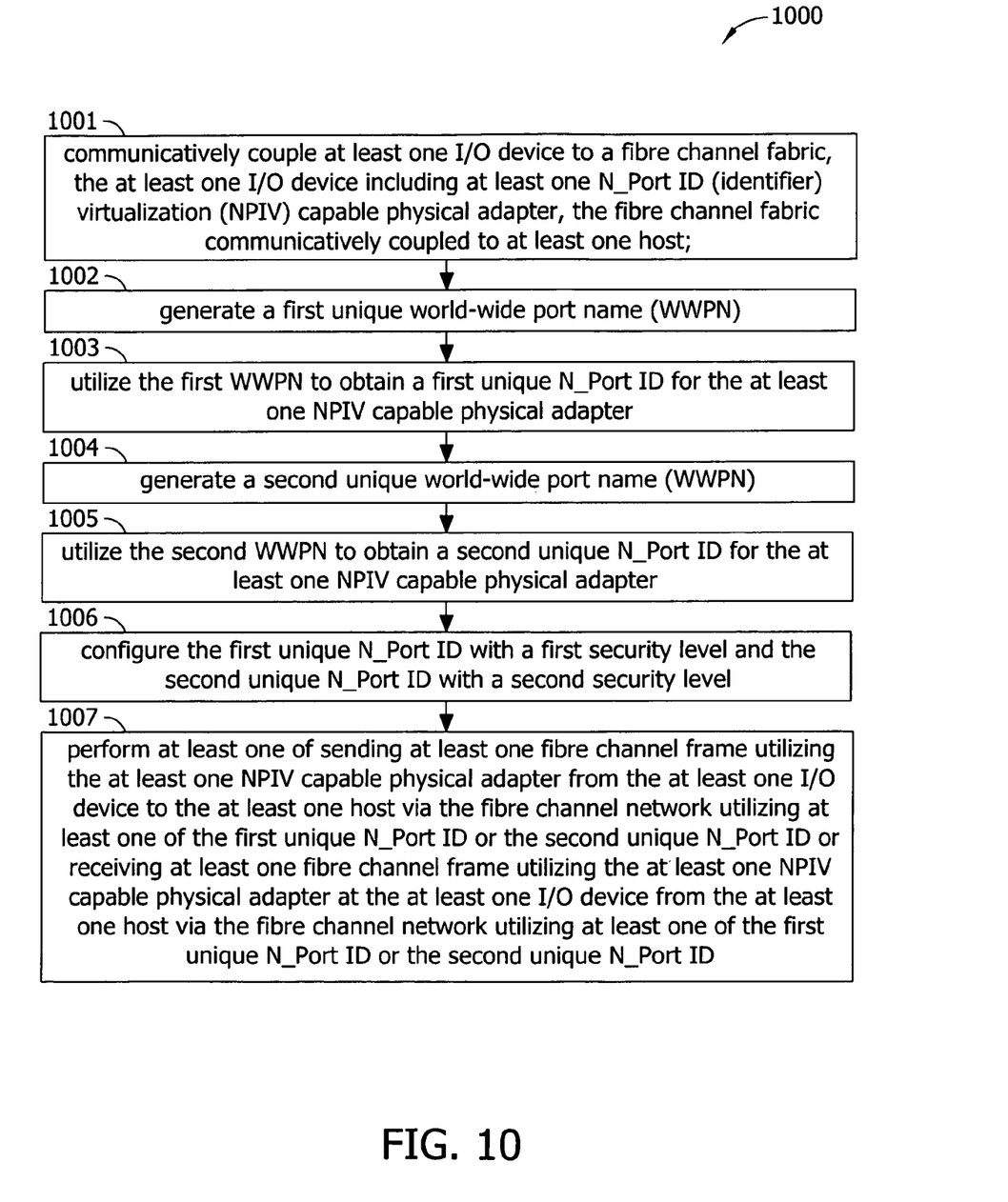
FIG. 10 is a flow diagram illustrating a method for I/O device N_Port ID virtualization, in accordance with an alternative embodiment of the present disclosure.

FIG. 10 illustrates a method for I/O device N_Port ID Virtualization, in accordance with an alternative embodiment of the present disclosure. In step 1001, communicatively couple at least one I/O device to a fibre channel fabric, the at least one I/O device including at least one N_Port ID (identifier) virtualization (NPIV) capable physical adapter, the fibre channel fabric communicatively coupled to at least one host. In step 1002, generate a first unique world-wide port name (WWPN). In step 1003, utilize the first WWPN to obtain a first unique N_Port ID for the at least one NPIC capable physical adapter. In step 1004, generate a second unique world-wide port name (WWPN). In step 1005, utilize the second WWPN to obtain a second unique N_Port ID for the at least one NPIC capable physical adapter. In step 1006, configure the first unique N_Port ID with a first security level and the second unique N_Port ID with a second security level. In step 1007, perform at least one of sending at least one fibre channel frame utilizing the at least one NPIV capable physical adapter from the at least one I/O device to the at least one host via the fibre channel network utilizing at least one of the first unique N_Port ID or the second unique N_Port ID or receiving at least one fibre channel frame utilizing the at least one NPIV capable physical adapter at the at least one I/O device from the at least one host via the fibre channel network utilizing at least one of the first unique N_Port ID or the second unique N_Port ID.

Although the methods illustrated in FIGS. 7-10 describe alternative embodiments where unique N_Port IDs may be assigned to different fabric zones, assigned unique LUNs, configured with differing quality of service attributes, and configured with differing security levels, it should be understood that alternative embodiments may include one or more of these features that the methods illustrated in FIGS. 7-10 implement separately. For example, an alternative embodiment may perform one or more of assigning unique N_Port IDs to different fabric zones, assigning unique N_Port IDs unique LUNs, configuring unique N_Port IDs with differing quality of service attributes, and configuring unique N_Port IDs with differing security levels without departing from the scope of the present disclosure.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
a fibre channel fabric comprising a first fabric zone and a second fabric zone, the first fabric zone partitioned from the second fabric zone; and
an I/O device communicatively coupled to the fibre channel fabric, the I/O device comprising a physical I/O adapter, wherein the I/O device is configured to:
generate a first unique port name
receive a first unique port identifier for the physical I/O adapter, the first unique port identifier based on the first unique port name;
generate a second unique port name;
receive a second unique port identifier for the physical I/O adapter, the second unique port identifier based on the second unique port name;
communicate with a host communicably coupled to the fibre channel fabric via the physical I/O adapter utilizing the first unique port identifier and the second unique port identifier,
wherein the first unique port identifier belongs to the first fabric zone and the second unique port identifier belongs to the second fabric zone, and wherein the first unique port identifier has an associated authentication key and the second unique port identifier does not have an associated authentication key.

2. The system of claim 1, wherein the I/O device comprises a first logical partition and a second logical partition, the first unique port identifier corresponds to the first logical partition (LPAR), and the second unique port identifier corresponds to the second LPAR.

3. The system of claim 1, wherein the first unique port identifier is associated with at least one of a first logical unit number or a first logical image and the second unique port identifier is associated with at least one of a second logical unit number or a second logical image.

4. The system of claim 1, wherein the first unique port identifier is configured with a first quality of service attribute and the second unique port identifier is configured with a second quality of service attribute, and wherein the first quality of service attribute comprises at least one of bandwidth, throughput, latency, and recovery attributes.

5. The system of claim 1, wherein the first unique port identifier is configured with a first security level and the second unique port identifier is configured with a second security level.

6. The system of claim 1, wherein the I/O device comprises an I/O controller conforming to at least one of Fibre Channel/Small Computer System Interface (SCSI) Protocol standard or Fibre Channel Single-Byte Command Code Sets-3 standard.

7. A method for port identification in an I/O device, comprising:
generating a first unique port name for the I/O device, wherein the I/O device is communicatively coupled to a fibre channel fabric comprising a first fabric zone and a second fabric zone, the first fabric zone partitioned from the second fabric zone, the I/O device comprising a physical I/O adapter;
receiving a first unique port identifier for the physical I/O adapter the first unique port identifier based on the first unique port name;
generating a second unique port name;
receiving a second unique port identifier for the physical I/O adapter the second unique port identifier based on the second unique port name;
assigning the first unique port identifier to correspond to the first fabric zone and the second unique port identifier to correspond to the second fabric zone, wherein the first unique port identifier has an associated authentication key and the second unique port identifier does not have an associated authentication key; and
communicating with a host communicably coupled to the fibre channel fabric via the physical I/O adapter utilizing the first unique port identifier and the second unique port identifier.

8. The method of claim 7, further comprising:
assigning the first unique port identifier to correspond to a first logical partition of the I/O device and the second unique port identifier to correspond to a second logical partition of the I/O device.

9. The method of claim 7, further comprising:
associating the first unique port identifier with at least one of a first logical unit number or a first logical image and the second unique port identifier with at least one of a second logical unit number or a second logical image.

10. The method of claim 7, further comprising configuring the first unique port identifier with a first quality of service attribute and the second unique port identifier with a second quality of service attribute, wherein the first quality of service attribute comprises at least one of bandwidth, throughput, latency, and recovery attributes.

11. The method of claim 7, further comprising:
configuring the first unique port identifier with a first security level and the second unique port identifier with a second security level.

12. The method of claim 7, wherein the I/O device comprises:
an I/O controller conforming to at least one of Fibre Channel/Small Computer System Interface (SCSI) Protocol standard or Fibre Channel Single-Byte Command Code Sets-3 standard.

13. A computer program product for port identification, the computer program product comprising:
a non-transitory computer readable storage medium having program instructions embodied therewith, the program instructions executable by an I/O device to cause the I/O device to:
generate a first unique port name for the I/O device, wherein the I/O device is communicatively coupled to a fibre channel fabric comprising a first fabric zone and a second fabric zone, the first fabric zone partitioned from the second fabric zone, the I/O device comprising a physical I/O adapter;
receive a first unique port identifier for the physical I/O adapter, the first unique port identifier based on the first unique port name;
generate a second unique port name;
receive a second unique port identifier for the physical I/O adapter, the second unique port identifier based on the second unique port name;
assign the first unique port identifier to correspond to the first fabric zone and the second unique port identifier to correspond to the second fabric zone, wherein the first unique port identifier has an associated authentication key and the second unique port identifier does not have an associated authentication key; and communicate with a host communicably coupled to the fibre channel fabric via the physical I/O adapter utilizing the first unique port identifier and the second unique port identifier.

14. The computer program product of claim 13, wherein the program instructions further cause the I/O device to: assign the first unique port identifier to correspond to a first logical partition of the I/O device and the second unique port identifier to correspond to a second logical partition of the I/O device.

15. The computer program product of claim 13, wherein the program instructions further cause the I/O device to: associate the first unique port identifier with at least one of a first logical unit number or a first logical image and the second unique port identifier with at least one of a second logical unit number or a second logical image.

16. The computer program product of claim 13, wherein the program instructions further cause the I/O device to configure the first unique port identifier with a first quality of service attribute and the second unique port identifier with a second quality of service attribute, wherein the first quality of service attribute comprises at least one of bandwidth, throughput, latency, and recovery attributes.

17. The computer program product of claim 13, wherein the program instructions further cause the I/O device to: configure the first unique port identifier with a first security level and the second unique port identifier with a second security level.

\* \* \* \* \*